United States Patent [19]
Caretta

[11] 3,990,493
[45] Nov. 9, 1976

[54] BREAKER STRUCTURE OF RADIAL TIRES

[75] Inventor: Renato Caretta, Gallarate (Varese), Italy

[73] Assignee: Industrie Pirelli S.p.A., Milan, Italy

[22] Filed: Oct. 29, 1974

[21] Appl. No.: 518,883

[30] Foreign Application Priority Data
Nov. 6, 1973 Italy.................................. 30953/73

[52] U.S. Cl....................... 152/361 R; 152/361 DM
[51] Int. Cl.².......................................... B60C 9/18
[58] Field of Search ......... 152/361 R, 361 DM, 354

[56] References Cited
UNITED STATES PATENTS

| | | | |
|---|---|---|---|
| 1,894,237 | 1/1933 | Mallory........................... | 152/361 R |
| 3,095,026 | 6/1963 | Weber........................ | 152/361 DM |
| 3,396,072 | 8/1968 | Wolfe.............................. | 152/361 R |
| 3,667,529 | 6/1972 | Mirtain....................... | 152/361 DM |
| 3,850,219 | 11/1974 | Snyder........................ | 152/361 DM |

Primary Examiner—Drayton E. Hoffman
Attorney, Agent, or Firm—Stevens, Davis, Miller & Mosher

[57] ABSTRACT

This invention relates to a radial ply tire containing an improved breaker structure, whereby, in addition to good characteristics of road holding and driving safety, also good features of comfort are obtained.

The breaker structure comprises at least two layers of metal cords, the cords of each layer being parallel and crossing those of the adjacent layer, said cords forming an angle between 10° and 35° with the equatorial axis of the tire, and at least one additional layer of textile cords arranged in a radially outermost position, said cords being orientated in the circumferential direction of the tire, which reduce in length when subjected to influence of heat, at least part of said textile cords having a limited length, less than that of the corresponding circumferential development of the tire.

4 Claims, 3 Drawing Figures

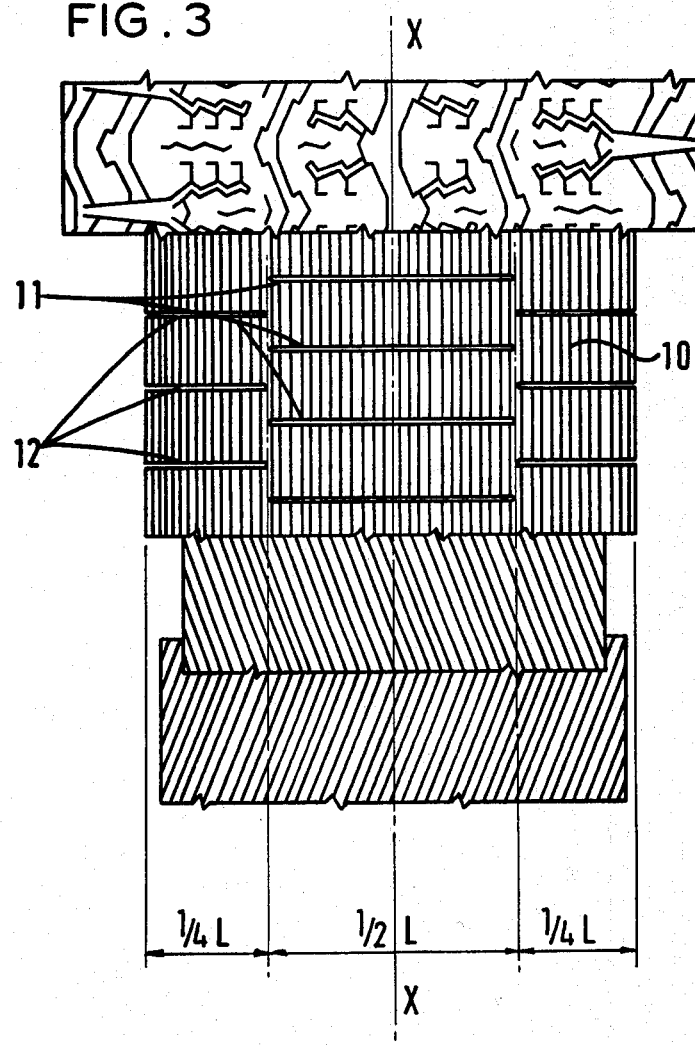

BREAKER STRUCTURE OF RADIAL TIRES

The present invention refers to "radial ply" tires, that is to those tires having a carcass made up of cords lying in radial planes or forming small angles with said planes; more particularly the invention refers to breaker structures for said radial tires.

It is known that the breaker influences the behavior of the tire in a determining way, both according to the angular relationship of the cords from which the various layers are made up and according to the materials chosen for said cords.

Tires of this type are well known for the good performance which they can provide; to give them functional characteristics in view of such performance, the choice of the arrangement of the cords of the various breaker layers and the choice of the materials from which they are made up are of great importance.

Although results obtained up to the present from various well known constructions are satisfactory, the demand for ever improved performance has led to the adoption of breaker structures which tend, in particular, to enhance some functional characteristics such as road holding, safe driving, lateral rigidity and so on; however, as a result, reduced comfort is noticed because of the excessive radial rigidity given to the breaker.

For example, there are known breaker structures consisting of two layers of metal cords crossing each other at relatively small angles (about 20°), on which layers of nylon cords are applied, orientated according to the circumferential direction of the tire.

The performance obtained from such breaker structures is certainly good; however, it has been possible to ascertain that a further improvement in said structure could be sought particularly in a reduction in the radial rigidity, in order to improve the comfort.

The aim of the present invention is to provide a tire which, while having good road holding and safe driving characteristics, has also high comfort characteristics. Another aim of the present invention is a particularly economical process for obtaining said tire.

The object of the present invention is, therefore, a tire consisting of a radial carcass, a tread and a breaker structure lying between said carcass and said tread, said breaker structure consisting of at least two layers of metal cords, the cords of each layer being parallel and crossing those of the adjacent layer, said cords forming an angle between 10° and 35° with the equatorial axis of the tire, said layers having a width not less than that of the tread, and at least one additional layer of textile cords oriented in the circumferential direction of the tire, which reduce in length when subjected to the influence of heat, said additional layer having a width not less than that of said metal layers and being arranged in a radially outermost position, at least part of said cords having a limited length, less than that of the corresponding circumferential development of the tire.

Another object of the present invention is a process for manufacturing radial tires, the breaker of which includes at least one additional layer of textile cords which reduce in length under the influence of heat, arranged in a radially outermost position in relation to other layers of the same breaker, said process including the stages of rubberizing a fabric consisting of continuous textile cords of the type mentioned, obtaining from said fabric strips of the required length and width, each strip forming said additional layer, the continuous cords of which are parallel and oriented lengthwise, the process comprising the further stages of coupling said strip to the radially innermost surface of a tread band, obtained separately by means of extrusion on an extruder, converting at least part of said continuous cords of each strip to discontinuous cords by means of cuts of the desired length, which is, however, less than the width of said strip and with a distance between them of a predetermined value, assembling the product so obtained on the green tire carcass, which is already shaped and provided with the other breaker layers, so as to superimpose said strip on said layers.

In the present invention, by "tread width" is meant all that part of the tire which comes in contact with the ground, either during straight running or in a curve, so that in the case of a tire with a tread joined to the sidewall's zone by wider or narrower connections, the tread is formed also by that lateral part which concerns these connections.

The main advantage which is obtained by adopting the breaker structure described above derives from the fact that said textile cords cooperate effectively with the metal cords to resist torsional deformations which the tire undergoes during service, while they have practically no influence on the radial deformations of the tire.

In fact, said cords, arranged according to the circumferential direction of the tire for the distance determined by their length, form true and proper "links" for the lozanges, formed by the crossed metal cords of the underlying breaker layers; in this way such lozanges become "bonded" by the textile cords and therefore oppose greater resistance to the deformations caused by said torsional stresses.

In addition, because of the difference between the elastic modulus of the metal cords and that of the textile cords, said "links" become, so to speak, "elastic", permitting on the one hand limited and controlled deformations of said lozanges, and on the other hand prompt readjustment to their original shape when the cause which produced such deformations ceases, with considerable improvement in the "speedy response" of the tire which occurs, for example, when the latter moves from a curved to a straight trajectory.

On the other hand, said textile cords, of shorter length than the corresponding circumferential development of the tire, can contract freely as a result of vulcanizing treatment, thus avoiding excessive belting of the underlying metal layers, which would inevitably produce a greater radial rigidity, with resulting reduction in the tire's comfort.

Preferably, the length of said textile cords is not greater than 1/10 of the corresponding circumferential development of the tire, said length being preferably between 1/100 and 4/100; the ends of said cords lying on inclined lines at an angle between 45° and 90° and preferably perpendicular to the direction of the cords.

In accordance with an embodiment of the present invention, said cords of limited length are located at least at the central zone of said breaker.

Preferably, said cords of limited length are located at the central zone of the said layer, cords of a length not less than that of the corresponding circumferential development of the tire being located at the lateral zones.

In accordance with another embodiment of the invention, said central zone has a width between 40 and 80% of the total width of said layer of textile cords, the widths of said lateral zones being equal.

The present invention will be better illustrated on the basis of the attached drawings, in which, for example:

FIG. 3 shows in plan view an alternative embodiment of the present invention.

Figure 1:
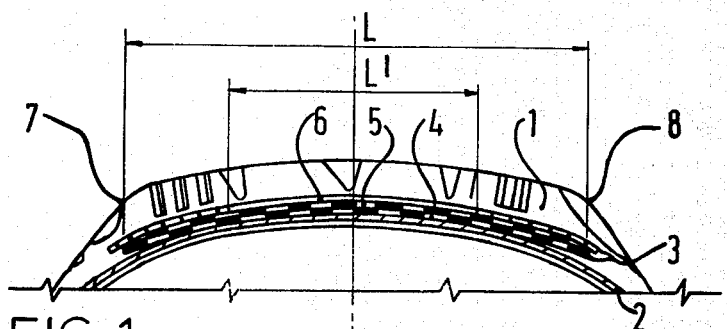
FIG. 1 represents schematically the section of the tread zone of a tire in accordance with the present invention.

In FIG. 1 the section of a tire is shown, having a tread 1 and a carcass 2, said carcass consisting of cords lying in radial planes or forming small angles with said planes.

Between said carcass and said tread a breaker 3 is inserted, which includes two layers of metal cords 4 and 5 and an additional layer of nylon cords 6, located radially outwards in relation to the metal layer 5.

Figure 2:
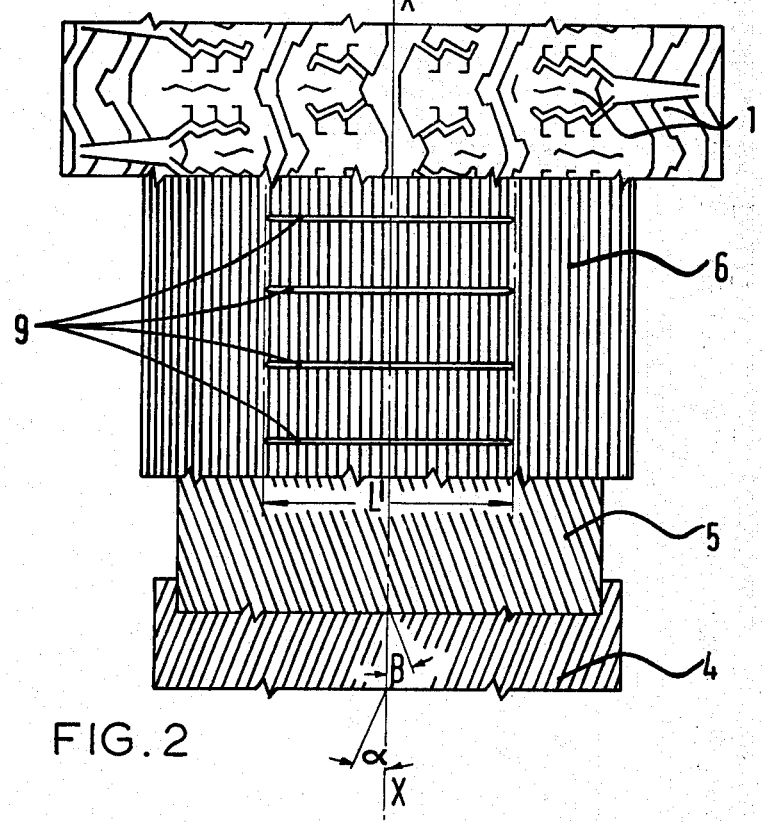
FIG. 2 represents a plan view of the breaker of the tire shown in FIG. 1, with parts removed to show the path of the cords.

As illustrated in FIG. 2, the metal cords of layer 4 are inclined at an angle $\alpha = 20°$ in relation to the equatorial plane XX of the tire, while the metal cords of the layer 5 are inclined in the opposite direction in relation to the same plane, at an angle $\beta = 20°$.

The width L of layer 4 substantially corresponds to the tread width, meaning by the latter all that part of the tire which comes in contact with the ground, either in straight running or on a curve, and which, in the case shown in FIG. 1, is defined by the distance between corners 7 and 8.

The width of layer 5 substantially corresponds to the width of layer 4, except for a small negative difference, due to graduation.

In a position radially outwards to the metal layer 5 there is located an additional layer 6 of nylon cords parallel to each other and to the equatorial plane XX of the tire. The width of layer 6 substantially corresponds to the width of layer 4, except for a small positive difference, due to graduation.

The centre part of the additional layer 6 (which, in the case shown, has a width L' of about 60% of width L, but which may also have different values), is concerned by a plurality of cuts 9, substantially perpendicular to the direction of the nylon cords of layer 6. Said cuts, the direction of which could also be chosen between 45° and 90° in relation to the direction of the cords, are equidistant, and limit for their total extent the length of the nylon cords to value not greater than 1/10, and preferably between 1/100 and 4/100 of the corresponding circumferential development of the tire.

For example, for a 165 SR13 tire size, with a maximum circumferential development of about 1890 mm, the length of said cords, or rather the distance between the cuts 9, may be conveniently chosen between 30 and 60 mm.

As shown in FIG. 2, the lateral zones of said additional layer 6 are not concerned by said cuts 9, and therefore their cords remain continuous over the whole circumferential development of the tire.

The breaker structure shown in FIGS. 1 and 2 can provide a high resistance to the tire's torsional deformations, and at the same time can have a low radial rigidity, with resultant comfort.

In fact, the continuous nylon cords of said lateral zones of the additional layer 6 have a tendency to contract under the influence of heat treatment which occurs when the tire is vulcanized; but such contraction is prevented by the compressive resistance of the layers of metal cords 4 and 5; therefore, in a cooled tire said nylon cords are in a state of pre-tension which reduces their extensibility and brings their dynamometric characteristics nearer to those of the metal cords of layers 4 and 5.

Such modifications enable the lateral zones of layer 6 to cooperate effectively with the metal cords of layers 4 and 5 to resist the torsional deformations of the tire.

On the contrary, the nylon cords in the central zone concerned by cuts 9, because of their limited length, can contract under the influence of vulcanization heat treatment, so that they can slide on the metal layers 4 and 5; therefore they are not in the above mentioned state of pre-tension, and hence do not modify their dynamometric characteristics.

In this way the nylon cords in the central zone of the breaker have a low belting effect on the layers of metal cords 4 and 5 and therefore have practically no influence on the radial rigidity of such zone, with the resulting effect of improving the tire's comfort.

This does not mean that the nylon cords in the central zone of the additional layer 6 have no effect on the tire's resistance to torsional deformation. In fact, as explained above, they form true and proper "links" for the lozanges formed by crossing the metal cords of layers 4 and 5, and hence said lozanges become bonded with the resulting smaller chance of deformations as a consequence of torsional stresses.

When it is desired further to reduce the radial rigidity of the breaker at the expense of a slight reduction in the resistance to torsional deformations, it is possible to adopt a structure of the type mentioned in FIG. 3, where an alternative embodiment of the present invention is shown.

In accordance with such embodiment (which is the same as the example in FIGS. 1 and 2, except for the additional layer of nylon cords) even the lateral zones of the breaker have nylon cords of a length less than that of the corresponding circumferential development of the tire.

In fact, the additional layer 10 has a central zone of a width equal to about 50% of the tread width L and two lateral zones, each of which has a width equal to about 25% L.

Said central zone and said two lateral zones are concerned respectively by cuts 11 and 12, substantially perpendicular to the direction of the nylon cords of layer 10.

The cuts 11 are equidistant and limit for their total extent the length of the nylon cords to values of the kind mentioned for FIG. 2.

In a similar way the cuts 12 are equidistant, but spaced half way with respect to cuts 11, and limit the length of the corresponding nylon cords to values of the same order.

In accordance with such structure all the nylon cords have a length less than that of the circumferential development of the tire, so that the additional layer 10 exerts a slight belting effect on the whole transversal extent of the layers of metal cords.

Naturally, it is possible to vary the width of the central zone or the space between each cut in the lateral zones according to the amount of radial rigidity which it is desired to allot to the former, or to the amount of torsional rigidity which it is desired to allot to the latter.

To produce a radial tire with a breaker of the type shown in FIGS. 1, 2 and 3, it is convenient to adopt a particularly advantageous manufacturing process from an economic point of view.

In accordance with such process, a piece of nylon fabric cords is rubberized by a normal calendering operation, said cords being continuous for their whole length, parallel and orientated in the direction of the length of said piece.

From the rubberized fabric, by means of standard cutting, several strips of undefined length and of the required width according to the size of the tire for which the strips are intended are obtained.

Each strip, which has its own cords parallel to its longer side, is attached to a green tread band of undefined length supplied from an extruder. As is well known, a tread band normally has two opposite surfaces: one shaped and intended to come in contact with the vulcanizing mold and the other flat and intended to be applied on the resistant structure of the tire. Taking into account the position which such tread band assumes on the finished tire, the first surface could be called "radially outermost", while the opposite surface could be called "radially innermost".

Said coupling is carried out so as to cause said cord strip to adhere to the flat or "radially innermost" surface of the tread band; for example, said band and said strip are progressively brought nearer together until there is a first contact between them and then caused to advance at the same time at the same speed until coupling is completed.

Naturally, the coupling operation must be carried out in such a way that the tread band is perfectly centered in relation to the cord strip.

On each strip coupled to said tread band there is then made, preferably by a multiple blade cutter, a plurality of cuts, which define the length of the concerned cords, each cut only concerning part of the width of said strip and being preferably orientated perpendicularly to the direction of the cords.

However, said cuts may also be orientated at an angle between 45° and 90° relative to the direction of the cords.

Alternatively, said cuts may only affect the central part of the strip, or even the lateral zones of the latter, in which latter case the cuts in the lateral zones are offset with respect to the cuts carried out in the central zone.

The length of the cuts in the central zone may be conveniently chosen from values between 40 and 80% of the total width of the strip; correspondingly, the relative cuts in the lateral zones have a length such as to concern the remaining cords of the strip.

The distance between one cut and the next may be conveniently chosen in such a way that the broken cords have a length not greater than 1/10 of the length of the strip, and preferably within values between 1/100 and 4/100 : the distance between the cuts in the central zone may either be equal to or less than the distance between the cuts in the lateral zones (naturally in the hypothesis that even these latter zones are concerned by said cuts).

After carrying out the operations described above, the cords lying in the run of said cuts are interrupted in their length; if cuts have not been carried out in the lateral zones, the relative cords maintain a length equal to that of the whole strip; the rubberizing compound is adequate to maintain the cut cords in their original position, so that the strip might even be hypothetically raised from the plane on which the cuts were carried out without the cords being displaced in respect to each other, because of this.

A suitable length is then allotted to the product thus obtained, which is chosen to suit the size of the tire for which it is intended; naturally, the opposite ends of said band and said srip are cut with a blade inclined with respect to the perpendicular to the cutting plane, so as to obtain two bevelled surfaces intended to be butt-joined.

The butt-joining of the ends of the cord strip gives the advantage of having no excess thicknesses due to the superimposition of said ends, and hence of having no static or dynamic unbalance in the tire due to the said excess thicknesses.

However, it is not excluded that the ends of the cord strip be overlapped for a short distance; in such case, the length of the strip will have to be correspondingly greater than that of the tread band.

The product obtained in this way from the coupling between said tread band and said strip, which forms the additional layer 6 in FIGS. 2 and 10 in FIG. 3, is then assembled on a green tire carcass already shaped and provided with the breaker layers, for example the cord layers 4 and 5 in FIG. 2, prepared separately by known processes.

Such assembly processes do not require special techniques compared with those already known for the application of a standard tread band to a carcass; in fact, as there is a high volume relationship between tread band and cord strip, the latter cannot undergo deformations, being protected by the former.

Although the process described above, which provides for the coupling of the strip of nylon cords with the tread band, so to speak "continuously" downstream the extrusion of the latter, and then the subsequent carrying out of the cuts which limit the length of said cords might be considered preferable, it is not excluded that the order of these operations might be reversed, in the sense that all the operations of sizing said strip might be carried out first, and the required cuts carried out on this strip, and then said strip is coupled to said tread band which had previously been allotted its own length and width to suit the tire for which it is intended.

It is understood that the present invention is not limited to the example described above and that all embodiments which utilize the inventive principle described above are included.

What I claim is:

1. In a tire for motor vehicles having a radial carcass, a tread and a breaker structure lying between said carcass and said tread, said breaker structure including at least two layers of metal cords, the cords of each layer being parallel and crossing those of the adjacent layer, said cords forming an angle between 10° and 35° with the equatorial axis of the tire, said layers having a width not less than that of the tread and at least one additional layer of textile cords orientated in the circumferential direction of the tire which reduce in length when subjected to the influence of heat, said additional layer having a width not less than that of said metal layers and being arranged in a radially outermost position, the improvement wherein at least part of said textile cords have a length not greater than 1/10 of the corresponding circumferential development of the tire and are arranged at the central zone of said additional layer, and cords having a length not less than that of the corresponding circumferential development of the tire are arranged in the lateral zone of said additional layer.

2. Tire for motorvehicles in accordance with claim 1, in which said central zone has a width between 40 and 80% of the total width of said layer of textile cords, the widths of said lateral zones being equal.

3. A pneumatic tire comprising
a radial ply carcass
a tread overlying the crown of the carcass, and
a breaker interposed between the carcass and tread, said breaker comprising
a first ply of substantially parallel spaced apart metal cords disposed adjacent to the carcass and on a bias with respect to the equatorial axis of the tire, the width of the first ply being about equal to the width of the tread,
a second ply of substantially parallel spaced apart metal cords disposed against the first ply and on a bias with respect to the equatorial axis of the tire and crossing the metal cords of said first ply, the width of the second ply being about equal to the width of the first ply,
a single ply of spaced textile cords disposed substantially parallel to the equatorial axis of the tire and against the said second ply, the width of the textile ply being about equal to the width of the first ply,
a plurality of circumferentially spaced slits disposed at an angle of from 45° to 90° with respect to the equatorial axis of the tire extending across the equatorial axis of the tire, and only across from 40 to 80% of the width of the textile ply, the length of the cords between slits being not more than 1/10 of the circumference of the tire, said cords in the unslit lateral areas of the textile ply being under tension and adapted to resist torsional deformation of the tire while the shorter textile cords support the crossed metal cords of the first and second plies against deformation under torsional stress without substantially increasing the rigidity of the tire.

4. The tire of claim 3 having slits in the lateral portions of the tires circumferentially spaced between the slits in the center portion.

* * * * *